(12) United States Patent
Mohr et al.

(10) Patent No.: US 6,699,811 B1
(45) Date of Patent: Mar. 2, 2004

(54) TAILORED ZEOLITE BOUND ZEOLITE CATALYST AND ITS USE FOR HYDROCARBON CONVERSION

(75) Inventors: Gary David Mohr, League City, TX (US); Kenneth Ray Clem, Humble, TX (US); Wilfried Jozef Mortier, Kessel-lo (BE); Machteld Maria Mertens, Boortmeerbeek (BE); Xiaobing Feng, League City, TX (US); Marc H. Anthonis, Hofstade (BE); Bart Schoofs, Leuven (BE)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/565,975

(22) Filed: May 5, 2000

Related U.S. Application Data

(60) Provisional application No. 60/132,710, filed on May 5, 1999.

(51) Int. Cl.$^7$ ................................................ B01J 29/06
(52) U.S. Cl. .............................. 502/67; 502/61; 502/64; 502/78; 502/69
(58) Field of Search ............................ 502/61, 63, 64, 502/67, 78, 69

(56) References Cited

U.S. PATENT DOCUMENTS

| | | | | |
|---|---|---|---|---|
| 4,872,968 A | * | 10/1989 | Bowes ..................... | 208/111.3 |
| 4,977,120 A | * | 12/1990 | Sakurada et al. ........... | 423/716 |
| 5,248,643 A | * | 9/1993 | Patil et al. .................. | 423/709 |
| 5,258,563 A | | 11/1993 | Gosling et al. ............. | 585/322 |
| 5,536,687 A | | 7/1996 | Ward ........................... | 502/67 |
| 5,665,325 A | * | 9/1997 | Verduijn ..................... | 423/709 |
| 5,993,642 A | * | 11/1999 | Mohr et al. ............. | 208/111.01 |
| 6,040,259 A | * | 3/2000 | Mohr et al. ..................... | 502/64 |
| 6,051,051 A | * | 4/2000 | Hees et al. ..................... | 95/130 |
| 6,150,293 A | * | 11/2000 | Verduijn et al. ............... | 502/63 |

FOREIGN PATENT DOCUMENTS

| | | | | |
|---|---|---|---|---|
| EP | 0599117 | 1/1994 | ............ | B01J/29/06 |
| WO | 96/16004 | 5/1996 | ............ | C07C/2/66 |
| WO | 97/45197 | 12/1997 | ............ | B01J/29/06 |
| WO | 97/45198 | 12/1997 | ............ | B01J/29/80 |
| WO | 99/28031 | 6/1999 | ............ | B01J/29/06 |
| WO | 99/28032 | 6/1999 | ............ | B01J/29/06 |

\* cited by examiner

*Primary Examiner*—Tom Dunn
*Assistant Examiner*—Christina Ildebrando

(57) ABSTRACT

There is provided a zeolite bound zeolite catalyst which does not contain significant amount of non-zeolitic binder and can be tailored to optimize its performance and a process for converting hydrocarbons utilizing the zeolite bound zeolite catalyst. The zeolite bound zeolite catalyst comprises core crystals containing first crystals of a first zeolite and optionally second crystals of a second zeolite having a composition, structure type, or both that is different from said first zeolite and binder crystals containing third crystals of a third zeolite and optionally fourth crystals of a fourth zeolite having a composition, structure type, or both that is different from said third zeolite. If the core crystals do not contain the second crystals of the second zeolite, then the binder crystals must contain the fourth crystals of the fourth zeolite. The zeolite bound zeolite finds application in hydrocarbon conversion processes, e.g., catalytic cracking, alkylation, disproportional of toluene, isomerization, and transalkylation reactions.

20 Claims, 3 Drawing Sheets

TAILORED ZEOLITE BOUND ZEOLITE CATALYST AND ITS USE FOR HYDROCARBON CONVERSION

This application claims priority to U.S. Provisional Patent Application No. 60/132,710, filed May 5, 1999, which is hereby incorporated by reference.

FIELD OF THE INVENTION

This invention relates to zeolite bound zeolite catalyst which can be tailored to optimize its performance and the use of the zeolite bound zeolite catalyst in hydrocarbon conversion processes.

BACKGROUND OF THE INVENTION

Crystalline microporous molecular sieves, both natural and synthetic, have been demonstrated to have catalytic properties for various types of hydrocarbon conversion processes. In addition, the crystalline microporous molecular sieves have been used as adsorbents and catalyst carriers for various types of hydrocarbon conversion processes, and other applications. These molecular sieves are ordered, porous, crystalline material having a definite crystalline structure as determined by x-ray diffraction, within which there are a large number of smaller cavities which may be interconnected by a number of still smaller channels or pores. The dimensions of these channels or pores are such as to allow for adsorption of molecules with certain dimensions while rejecting those of large dimensions. The interstitial spaces or channels formed by the crystalline network enable molecular sieves such as crystalline silicates, aluminosilicates, crystalline silicoalumino phosphates, and crystalline aluminophosphates, to be used as molecular sieves in separation processes and catalysts and catalyst supports in a wide variety of hydrocarbon conversion processes.

Within a pore of the crystalline molecular sieve, hydrocarbon conversion reactions such as paraffin isomerization, olefin skeletal or double bond isomerization, disproportionation, alkylation, and transalkylation of aromatics are governed by constraints imposed by the channel size of the molecular sieve. Reactant selectivity occurs when a fraction of the feedstock is too large to enter the pores to react; while product selectivity occurs when some of the products can not leave the channels or do not subsequently react. Product distributions can also be altered by transition state selectivity in which certain reactions can not occur because the reaction transition state is too large to form within the pores. Selectivity can also result from configuration constraints on diffusion where the dimensions of the molecule approach that of the pore system. Non-selective reactions on the surface of the molecular sieve, such reactions on the surface acid sites of the molecular sieve, are generally not desirable as such reactions are not subject to the shape selective constraints imposed on those reactions occurring within the channels of the molecular sieve.

Zeolites are crystalline microporous molecular sieves that are comprised of a lattice silica and optionally alumina combined with exchangeable cations such as alkali or alkaline earth metal ions. Although the term "zeolites" includes materials containing silica and optionally alumina, it is recognized that the silica and alumina portions may be replaced in whole or in part with other oxides. For example, germanium oxide, titanium oxide, tin oxide, phosphorous oxide, and mixtures thereof can replace the silica portion. Boron oxide, iron oxide, gallium oxide, indium oxide, and mixtures thereof can replace the alumina portion. Accordingly, the terms "zeolite", "zeolites" and "zeolite material", as used herein, shall mean not only materials containing silicon and, optionally, aluminum atoms in the crystalline lattice structure thereof, but also materials which contain suitable replacement atoms for such silicon, and aluminum such as gallosilicates, borosilicates, silicoaluminophosphates (SAPO) and aluminophosphates (ALPO). The term "aluminosilicate zeolite", as used herein, shall mean zeolite materials consisting essentially of silicon and aluminum atoms in the crystalline lattice structure thereof.

In certain hydrocarbon conversion processes, it is sometimes desirable that the catalyst used in the process be tailored to maximize its performance in specific hydrocarbon conversion processes. For instance, it is sometimes desirable that the catalyst used in a hydrocarbon conversion process be a multifunctional catalyst, e.g., a trifunctional catalyst or a bifunctional catalyst. A bifunctional catalyst comprises two separate catalysts, e.g., two zeolites having different compositions or structure types, which induce separate reactions. The reaction products can be separate or the two catalysts can be used together such that the reaction product of one catalyst is transported to and reacts on a catalyst site of the second catalyst. Also, since one of the benefits of using a zeolite catalyst is that the catalyst is shape selective and non-selective reactions on the surface of the zeolite are usually not desirable, it is sometimes desirable that the catalyst used in a hydrocarbon conversion process have the capability of preventing or at least reducing unwanted reactions which may take place on the surface of the zeolite catalyst by selectively sieving molecules in the feedstream based on their size or shape to prevent undesirable molecules present in the feedstream from entering the catalytic phase of the zeolite catalyst and reacting with the catalyst. In addition, the performance of a zeolite catalyst can sometimes be maximized if the catalyst selectively sieves desired molecules based on their size or shape in order to prevent the molecules from exiting the catalyst phase of the catalyst.

Hydrocarbon conversion using catalysts containing two different zeolites have been proposed in the past. For example, U.S. Pat. No. 5,536,687 involves a hydrocracking process using a catalyst containing crystals of zeolite beta and zeolite Y that are bound by an amorphous binder material such as alumina.

Zeolite crystals have good adsorptive properties, but their practical applications are severely limited because it is difficult to operate fixed beds with zeolite powder. Therefore, prior to using the crystals in commercial processes, mechanical strength is conventionally conferred on the zeolite crystals by forming a zeolite aggregate such as a pill, sphere, or extrudate. The extrudate can be formed by extruding the zeolite crystals in the presence of a non-zeolitic binder and drying and calcining the resulting extrudate. The binder materials used are resistant to the temperatures and other conditions, e.g., mechanical attrition, which occur in various hydrocarbon conversion processes. It is generally necessary that the zeolite be resistant to mechanical attrition, that is, the formation of fines which are small particles, e.g., particles having a size of less than 20 microns. Examples of suitable binders include amorphous materials such as alumina, silica, titania, and various types of clays.

Although such bound zeolite aggregates have much better mechanical strength than the zeolite powder, when the bound zeolite is used in a catalytic conversion process, the performance of the catalyst, e.g., activity, selectivity, activity maintenance, or combinations thereof, can be reduced because of the amorphous binder. For instance, since the binder is typically present in amounts of up to about 60 wt. % of the bound catalyst, the amorphous binder dilutes the adsorptive properties of the zeolite aggregate. In addition, since the bound zeolite is prepared by extruding or otherwise forming the zeolite with the amorphous binder and subsequently drying and calcining the extrudate, the amorphous binder can penetrate the pores of the zeolite or otherwise block access to the pores of the zeolite, or slow the rate of mass transfer to and from the pores of the zeolite which can reduce the effectiveness of the zeolite when used in hydrocarbon conversion processes and other applications. Furthermore, when a bound zeolite is used in catalytic conversion processes, the amorphous binder may affect the chemical reactions that are taking place within the zeolite and also may itself catalyze undesirable reactions which can result in the formation of undesirable products. Therefore, it is desirable that zeolite catalysts used in hydrocarbon conversion not include deleterious amounts of such binders.

The present invention provides a zeolite bound zeolite catalyst for use in hydrocarbon conversion processes which overcomes or at least mitigates the above described problems and can be tailored to optimize its performance.

SUMMARY OF THE INVENTION

The present invention is directed to a zeolite bound zeolite catalyst that can be tailored to optimize its performance in hydrocarbon conversion. The zeolite bound zeolite catalyst contains core crystals comprising first crystals of a first zeolite and optionally second crystals of a second zeolite having a composition or structure type that is different from said first zeolite and binder crystals containing third crystals of a third zeolite and optionally fourth crystals of a fourth zeolite having a composition or structure type that is different from said third zeolite. If the core crystals of the zeolite bound zeolite catalyst do not contain, in addition to the first crystals of the first zeolite, second crystals of said second zeolite, then the binder crystals will contain, in addition to the third crystals of the third zeolite, fourth crystals of fourth zeolite. The zeolite bound zeolite catalyst can contain both second crystals of a second zeolite and fourth crystals of a fourth zeolite. The structure type and/or composition of the zeolites are usually tailored to provide a zeolite bound zeolite catalyst having enhanced performance. For example, the zeolite bound zeolite catalyst can be tailored to be multifunctional and/or can be tailored to prevent undesirable molecules from entering or exiting the catalytic phase of the zeolite bound zeolite catalyst.

In another embodiment, the present invention provides a process for the conversion of hydrocarbon feeds using the zeolite bound zeolite catalyst. Examples of such processes include processes where catalyst acidity in combination with zeolite structure are important for reaction selectivity, e.g., catalytic cracking, alkylation, dealkylation, disproportionation, and transalkylation reactions. The process also finds particular application in hydrocarbon conversion processes in which carbon-containing compounds are changed to different carbon containing compounds. Examples of such processes include dehydrogenation, hydrocracking, isomerization, dewaxing, oligomerization, and reforming processes.

DETAILED DESCRIPTION OF THE INVENTION

Figure 1:
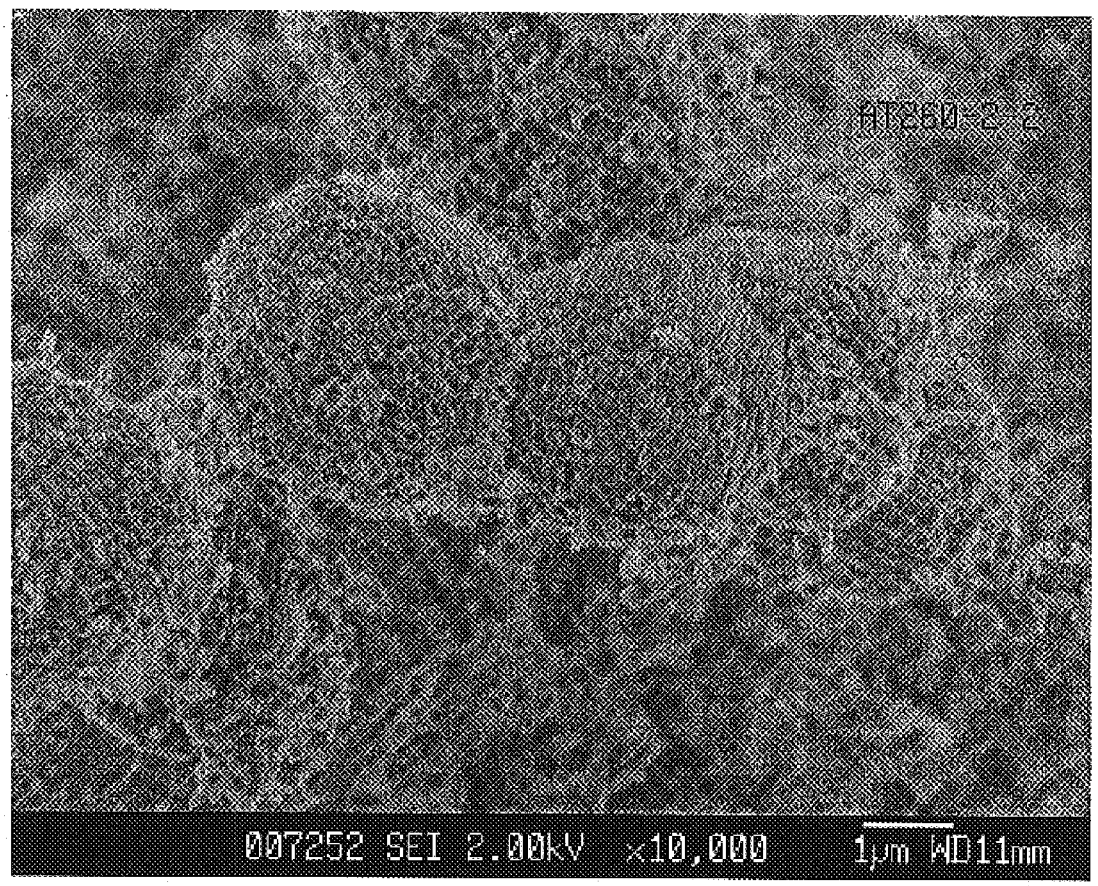
FIG. 1 represents an electron micrograph of the catalyst prepared in Example 1.

In a preferred embodiment of the present invention, the core crystals of zeolite bound zeolite catalyst will contain first crystals a first zeolite and second crystals of a second zeolite having a composition, structure type, or both that is different from said first zeolite and the binder will comprise third crystals of a third zeolite. The composition and/or structure type of the first zeolite can be the same or can be different from the composition, structure type, or both of the third zeolite.

In another preferred embodiment, the core crystals of the zeolite bound zeolite catalyst will contain first crystals a first zeolite and the binder will contain third crystals of a third zeolite and fourth crystals of a fourth zeolite having a composition, structure type, or both that is different from said third zeolite. The composition and/or structure type of the first zeolite can be the same or can be different from the composition, structure type, or both of the third zeolite.

The presence of the second zeolite, fourth zeolite, or both in the zeolite bound zeolite catalyst can afford a number of advantages. For instance, the presence of the zeolite can maximize the catalyst's performance for specific hydrocarbon conversion processes. For example, in catalytic cracking, the core crystals of the zeolite bound zeolite can contain two zeolites having different structures, e.g., the first zeolite can have a large pore or intermediate pore size and the second zeolite can have a smaller pore size than the first zeolite (intermediate or small pore when the first zeolite has a large pore and small pore when the first zeolite is an intermediate pore) with resultant production of enhanced amounts of desired product.

When four zeolites are present in the zeolite bound zeolite, the zeolite bound zeolite can have four zeolites with each having a different composition, structure type or both. The zeolite bound zeolite catalyst can further contain, in addition to first, second, third, and fourth zeolites additional zeolites having different compositions, structure types, or both and these zeolites can be present in the core crystals, binder crystals, or both In addition to the zeolite bound zeolite catalyst having the capability of being multifunctional, the zeolite binder crystals can provide a means for controlling undesirable reactions taking place on or near the external surface of the core crystals and/or can affect the mass transfer of hydrocarbon molecules to and from the pores of the core crystals. Alternatively, the binder crystals, if desired, can have catalytic activity, can function as a catalyst carrier, and/or can selectively prevent undesirable molecules from entering or exiting the pores of the first and second zeolite.

Although the invention is not intended to be limited to any theory of operation, it is believed that one of the advantages of the zeolite bound zeolite catalyst of the present invention is obtained by the zeolite binder crystals controlling the accessibility of the acid sites on the external surfaces of the core crystals to reactants. Since the acid sites existing on the external surface of a zeolite catalyst are not shape selective, these acid sites can adversely affect reactants entering the pores of the zeolite and products exiting the pores of the zeolite. In line with this belief, since the acidity and structure type of the binder can be carefully selected, the binder does not significantly adversely affect the reactants exiting the zeolite pores of the core crystals which can occur with conventionally bound zeolite catalysts and may beneficially affect the reactants exiting the pores of the zeolite. Still further, since the zeolite binder is not amorphous but, instead, is a molecular sieve, hydrocarbons may have increased access to the pores of the core crystals during hydrocarbon conversion processes. Regardless of the theories proposed, the zeolite bound zeolite catalyst, when used in catalytic processes, has one or more of the improved properties which are disclosed herein.

The zeolite bound zeolite catalyst of the present invention generally does not contain significant amounts of non-zeolitic binders. Preferably, the zeolite bound zeolite catalyst contains less than 10 percent by weight, based on the weight of the catalyst, more preferably contains less than 5 percent by weight, and, most preferably, the catalyst is substantially free of non-zeolitic binder. Preferably, the binder crystals bind the core crystals by adhering to the surface of the core crystals thereby forming a matrix or bridge structure which also holds the core crystals together.

The terms "acidity", "lower acidity", "moderate acidity", and "higher acidity" as applied to zeolite are known to persons skilled in the art. The acidic properties of zeolite are well known. However, with respect to the present invention, a distinction must be made between acid strength and acid site density. Acid sites of a zeolite can be a Bronsted acid or a Lewis acid. The density of the acid sites and the number of acid sites are important in determining the acidity of the zeolite. Factors directly influencing the acid strength are (i) the chemical composition of the zeolite framework, i.e., relative concentration and type of tetrahedral atoms, (ii) the concentration of the extra-framework cations and the resulting extra-framework species, (iii) the local structure of the zeolite, e.g., the pore size and the location, within the crystal or at/near the surface of the zeolite, and (iv) the pretreatment conditions and presence of co-adsorbed molecules. The amount of acidity is related to the degree of isomorphous substitution provided, however, such acidity is limited to the loss of acid sites for a pure $SiO_2$ composition. As used herein, the terms "acidity", "lower acidity" and "higher acidity" refers to the concentration of acid sites irregardless of the strength of such acid sites which can be measured by ammonia absorption.

Zeolites suitable for use in the zeolite bound zeolite catalyst of the present invention include any of the naturally occurring or synthetic crystalline zeolites. Examples of these zeolites include large pore zeolites, intermediate size pore zeolites, and small pore zeolites. These zeolites are described in "Atlas of Zeolite Structure Types", eds. W. H. Meier, D. H. Olson and Ch. Baerlocher, Elsevier, Fourth Edition, 1996, which is hereby incorporated by reference. A large pore zeolite generally has a pore size of at least about 7 Å and includes LTL, VFI, MAZ, MEI, FAU, EMT, OFF, *BEA, and MOR structure type zeolites (IUPAC Commission of Zeolite Nomenclature). Examples of large pore zeolites, include mazzite, offretite, zeolite L, VPI-5, zeolite Y, zeolite X, omega, Beta, ZSM-3, ZSM-4, ZSM-18, ZSM-20, MCM-9, MCM-41, MCM-41S, MCM-48, and SAPO-37. An intermediate pore size zeolite generally has a pore size from about 5 Å to about 7 Å and includes, for example, MFI, MEL, MTW, EUO, MTT, HEU, FER, MFS, and TON structure type zeolites (IUPAC Commission of Zeolite Nomenclature). Examples of intermediate pore size zeolites, include ZSM-5, ZSM-12, ZSM-22, ZSM-23, ZSM-34, ZSM-35, ZSM-38, ZSM-48, ZSM-50, ZSM-57, MCM-22, MCM-36, MCM-49, MCM-56, MCM-68, silicalite, and silicalite 2. A small pore size zeolite has a pore size from about 3 Å to about 5.0 Å and includes, for example, CHA, ERI, KFI, LEV, and LTA structure type zeolites (IUPAC Commission of Zeolite Nomenclature). Examples of small pore zeolites include ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, and clinoptilolite.

The first, second, third, and fourth zeolites used in the zeolite bound zeolite catalyst preferably comprise compositions that have the following molar relationship:

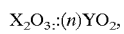
$$X_2O_3{:}(n)YO_2,$$

wherein X is a trivalent element, such as titanium, boron, aluminum, iron, and/or gallium, Y is a tetravalent element such as silicon, tin, and/or germanium, and n has a value of at least 2, said value being dependent upon the particular type of zeolite and the trivalent element present in the zeolite.

When the first, second, third, or fourth zeolites have an intermediate pore size, the zeolite preferably comprises a composition having the following molar relationship:

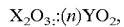
$$X_2O_3{:}(n)YO_2,$$

wherein X is a trivalent element, such as aluminum, and/or gallium, Y is a tetravalent element such as silicon, tin, and/or germanium; and n has a value greater than 10, said value being dependent upon the particular type of zeolite and the trivalent element present in the zeolite. When the zeolites have a MFI structure, n is preferably greater than 20.

As known to persons skilled in the art, the acidity of a zeolite can be reduced using many techniques such as by dealumination and steaming. In addition, the acidity of a zeolite is dependent upon the form of the zeolite with the hydrogen form having the highest acidity and other forms of the zeolite such as the sodium form having less acidity than the acid form. Accordingly, the mole ratios of silica to alumina and silica to gallia disclosed herein shall include not only zeolites having the disclosed mole ratios, but shall also include zeolites not having the disclosed mole ratios but having equivalent catalytic activity.

When the first zeolite, second zeolite, third zeolite, or fourth zeolite is a gallosilicate intermediate pore size zeolite, the zeolite preferably comprises a composition having the following molar relationship:

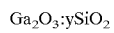
$$Ga_2O_3{:}ySiO_2$$

wherein y is between about 24 and about 500. The zeolite framework may contain only gallium and silicon atoms or may also contain a combination of gallium, aluminum, and silicon. When the first or second zeolite is a MFI structure type gallosilicate zeolite, the zeolite in the binder will preferably be an intermediate pore size zeolite having a silica to gallia mole ratio greater than 100. The zeolite in the binder can also have higher silica to gallia mole ratios, e.g., greater than 200, 500, 1000, etc.

When the first zeolite and, if present, second zeolite used in the zeolite bound zeolite catalyst is an aluminosilicate zeolite, the silica to alumina mole ratio will usually depend upon the structure type of the zeolite and the particular hydrocarbon process in which the catalyst system is utilized and is therefore not limited to any particular ratio. Generally, however, and depending on the structure type of the zeolite, the zeolite will have a silica to alumina mole ratio of at least 2:1 and in some instances from 4:1 to about 7:1. For a number of zeolites, especially intermediate pore size zeolites, the silica to alumina mole ratio will be in the range of from about 10:1 to about 1,000:1. When the catalyst is utilized in acid catalyzed reactions such as cracking, the manufacture of paraxylene and benzene by the disproportionation of toluene, the alkylation of benzene or the like, at least one zeolite will be acidic and will preferably, when it is an intermediate pore size zeolite, have higher silica to alumina mole ratios, e.g., 20:1 to about 200:1. If the catalyst is utilized in a process where acid catalyzed reactions may not desired, such as the reforming of naphtha, the first zeolite and, if present, second zeolite will preferably exhibit reduced acid activity.

The composition and structure type of the first zeolite and second zeolite will depend on the particular hydrocarbon process in which the zeolite catalyst is utilized. For instance, if the catalyst is used for the reforming of naphtha to aromatics, the structure type will preferably be LTL (example Zeolite L) and have a silica to alumina ratio from 4:1 to about 7:1. If the catalyst is be used for xylene isomerization or the manufacture of paraxylene and benzene by the disproportionation of toluene, the first zeolite and second zeolite (optionally present) will preferably have an intermediate pore size zeolite. If the zeolite bound zeolite catalyst is to be used for cracking paraffins, the preferred pore size and structure type will depend on the size of the molecules to be cracked and the desired product.

The term "average particle size" as used herein, means the arithmetic average of the diameter distribution of the crystals on a volume basis.

The average particle size of the core crystals will vary and will usually be from about 0.1 to about 15 microns. In some applications, the average particle size will preferably be at least about 1 to about 6 microns. In other applications such as the cracking of hydrocarbons, the preferred average particle size will be from about 0.1 to about 3.0 microns. When the core crystals comprise first crystals of a first zeolite and second crystals of a second zeolite, the average particle size of first crystals is sometimes more than twice as large as the average particle size of the second crystals. Also, if both crystals are present, the amount of second crystals present can vary and can even be in small amounts, e.g., less than 5% by weight based on the weight of the first crystals and second crystals.

The composition and structure type of the third zeolite and, if present, fourth zeolite will depend on the intended use of the zeolite bound zeolite catalyst. For instance, if the zeolite bound zeolite catalyst contains first zeolite and second zeolite core crystals and third zeolite binder crystals and is utilized as a xylenes isomerization/ethylbenzene dealkylation catalyst, then the first zeolite can be selected such that the dealkylation of the ethylbenzene can occur at the catalytic phase of the first zeolite, and the xylene isomerization can primarily occur at the catalytic phase of the second zeolite and the binder zeolite can be selected to reduce surface acidity of the first zeolite and second zeolite. If the zeolite bound zeolite catalyst is to be utilized in a cracking process, the zeolites can have acid activity and the structure type of each zeolite can be selected such that its pore size allows into its channels the larger molecules where they are subject to cracking into small products. After the larger molecules are cracked, the cracked molecules can then enter pores of smaller pore size zeolite where they can be subject to further cracking, isomerization, or oligomerization depending on the desired resulting product. The zeolite bound zeolite catalyst can also be tailored so that the zeolite of the binder crystals will sieve feed components entering the pores of the zeolite core crystals or sieve product components exiting the channels of the zeolite core crystals. For instance, if the zeolite bound zeolite catalyst comprises an appropriate pore size binder zeolite, e.g., third and optionally fourth zeolite, it can function to sieve and sort out molecules based on their size or shape and thereby prevent undesirable molecules from entering or exiting, as the case may be, the catalytic phase of the zeolite core crystals.

When the third or fourth zeolite is aluminosilicate zeolite, the silica to alumina mole ratio will usually depend upon the structure type of the zeolite and particular hydrocarbon process in which the catalyst is utilized and is therefore not limited to any particular ratio. Generally, however, and depending on the structure type of the zeolite, the silica to alumina ratio will be at least 2:1. In applications where the aluminosilicate zeolite is an intermediate pore size zeolite and low acidity is desired, the binder zeolite preferably has a silica to alumina mole ratio greater than the silica to alumina mole ratio of the first zeolite, and more preferably is greater than 200:1. The binder zeolite can also have higher silica to alumina mole ratios, e.g., 300:1, 500:1, 1,000:1, etc. The binder zeolite can be a Silicalite i.e., the zeolite is a MFI structure type substantially free of alumina and/or Silicalite 2, i.e., the zeolite is a MEL structure type substantially free of alumina and mixtures thereof. The pore size of the binder zeolite will preferably be a pore size that does not adversely restrict access of the desired molecules of the hydrocarbon feedstream to the catalytic phase of the zeolite bound zeolite. For instance, when the materials of the feedstream which are to be converted by the zeolite core crystals have a size from 5 Å to 6.8 Å, the binder zeolite will preferably be a large pore zeolite or an intermediate pore size zeolite.

The binder crystals are usually present in the zeolite bound zeolite catalyst in an amount in the range of from about 10 to about 60% by weight based on the weight of the catalyst but the amount of binder crystals present will usually depend on the hydrocarbon process in which the catalyst is utilized. More preferably the amount of binder crystals present is from about 20 to about 50% by weight. When the binder crystals comprise third crystals of a third zeolite and fourth crystals of a fourth zeolite, the average particle size of third crystals can be smaller or larger than the average particle size of the fourth crystals.

If both third and fourth crystals are present in the zeolite bound zeolite catalyst, the amount of fourth crystals present can vary and can be in small amounts, e.g., less than 20% by weight based on the weight of the third crystals and fourth crystals.

The binder crystals usually have a smaller size than the core crystals. The binder crystals preferably have an average particle size of less than 1 micron, preferably from about 0.1 to less than 0.5 micron. The binder crystals, in addition to binding the core crystals and maximizing the performance of the catalyst will preferably intergrow and to form an overgrowth or partial over-growth over the first zeolite. If the second zeolite is present, the binder crystals can also overgrow this zeolite. When binder crystals comprise crystals of two zeolites having different compositions, structure types, or both, the average particle size of each can be the same or different, i.e., larger or smaller. Sometimes, the coating will be resistant to attrition.

The amount of second zeolite and/or fourth zeolite present in the zeolite bound zeolite catalyst will generally depend on the particular process in which the zeolite bound zeolite catalyst and usually be an amount in the range of from about 1.0 to about 70% by weight based on the weight of the catalyst.

The zeolite bound zeolite catalyst can be prepared using a three step procedure. The first step involves the synthesis of the zeolite core crystals. Processes for preparing these zeolites are known to persons skilled in the art. For example, MFI structure type zeolites can be prepared using the process described in PCT Publication WO 98/16469 which is hereby incorporated by reference. If the core crystals contain first zeolite crystals and second zeolite crystals, the zeolites can be made individually or the zeolites can be made by converting a synthesis mixture under conditions which favor the formation of two separate zeolites. For example, MFI and MEL structure type zeolites can be made in the same zeolite synthesis mixture.

Next, a silica-bound zeolite is prepared preferably by mixing a mixture comprising the core crystals, a silica gel or sol, water and optionally an extrusion aid until a homogeneous composition in the form of an extrudable paste develops. The silica binder used in preparing the silica bound zeolite aggregate is preferably a silica sol and can contain various amounts of trivalent metal oxides such as alumina. The amount of zeolite in the dried extrudate at this stage will preferably range from about 40 to 90% by weight, more preferably from about 50 to 80% by weight, with the balance being primarily silica, e.g. about 20 to 50% by weight silica.

The resulting paste is then molded, e.g. extruded, and cut into small strands, e.g., 2 mm diameter extrudates, which are dried at 100–150° C. for a period of 4–12 hours and then calcined in air at a temperature of from about 400° C. to 550° C. for a period of from about 1 to 10 hours.

Optionally, the silica-bound aggregate can be made into a very small particles which have application in fluid bed processes such as catalytic cracking. This preferably involves mixing the core crystal zeolite with a silica containing matrix solution so that an aqueous solution of the zeolite and silica binder is formed which can be sprayed dried to result in small fluidizable silica-bound aggregate particles. Procedures for preparing such aggregate particles are known to persons skilled in the art. An example of such a procedure is described by Scherzer (Octane-Enhancing Zeolitic FCC Catalysts, Julius Scherzer, Marcel Dekker, Inc. New York, 1990). The fluidizable silica-bound aggregate particles, like the silica bound extrudates described above, would then undergo the final step described below to convert the silica binder to a second zeolite.

The final step in the three step catalyst preparation process is the conversion of the silica present in the silica-bound zeolite to the binder zeolite. The binder crystals bind the core crystals together. The zeolite core crystals are thus held together without the use of a significant amount of non-zeolite binder.

To prepare the zeolite bound zeolite, the silica-bound aggregate is preferably first aged in an appropriate aqueous solution at elevated temperature. Next, the contents of the solution and the temperature at which the aggregate is aged are selected to convert the amorphous silica binder into one or more zeolites. The newly-formed zeolite, which can comprise more than one zeolite, is produced as crystals. The crystals may grow on and/or adhere to the core crystals, and may also be produced in the form of new intergrown crystals, which are generally much smaller than the initial crystals, e.g., of sub-micron. size. These newly formed crystals may grow together and interconnect.

The nature of the zeolite formed in the secondary synthesis conversion of the silica to zeolite may vary as a function of the composition of the secondary synthesis solution and synthesis aging conditions. The secondary synthesis solution is preferably an aqueous ionic solution containing a source of hydroxy ions sufficient to convert the silica to the desired zeolite, which can be two or more separate zeolites. It is important, however, that the aging solution be of a composition which will not cause the silica present in the bound zeolite extrudate to dissolve out of the extrudate. Sometimes it may be desirable to have part of the zeolite crystals dissolved to form one or more zeolites having a different composition, structure type or both. Other times it may not be desirable to dissolve the zeolite crystals.

The zeolites present in the zeolite bound zeolite catalyst may be further ion exchanged as is known in the art either to replace at least in part the original metals present in the zeolite with a different cation, e.g. a Group IB to VIII of the Periodic Table metal such as nickel, copper, zinc, calcium or rare earth metal, or to provide a more acidic form of the zeolite by exchange of alkali metal with intermediate ammonium, followed by calcination of the ammonium form to provide the acidic hydrogen form. The acidic form may be readily prepared by ion exchange using a suitable acidic reagent such as ammonium nitrate. The zeolites may then be calcined at a temperature of 400–550° C. for a period of 10–45 hours to remove ammonia and form the acidic hydrogen form. Particularly preferred cations are those that make the catalyst catalytically active, especially for hydrocarbon conversion processes. These include hydrogen, rare earth metals, and metals of Groups IIA, IIIA, IVA, IB, IIB, IIIB, IVB, and VIII of the Periodic Table of the Elements. Preferred metals include Group VIII metals (i.e., Pt. Pd, Ir, Rh, Os, Ru, Ni, Co, and Fe), Group IVA metals (i.e., Sn and Pb), Group VB metals (i.e., Sb and Bi), and Group VIIB metals (i.e., Mn, Tc, and Re). Noble metals (i.e., Pt, Pd, Ir, Rh, Os, and Ru) are sometimes more preferred.

The zeolite bound zeolite catalyst of the present invention can be used in processing hydrocarbon feedstocks. Hydrocarbon feed-stocks contain carbon compounds and can be from many different sources, such as virgin petroleum fractions, recycle petroleum fractions, tar sand oil, and, in general, can be any carbon containing fluid susceptible to zeolitic catalytic reactions. Depending on the type of processing the hydrocarbon feed is to undergo, the feed can contain metal or can be free of metals. Also, the feed can also have high or low nitrogen or sulfur impurities.

The conversion of hydrocarbon feeds can take place in any convenient mode, for example, in fluidized bed, moving bed, or fixed bed reactors depending on the types of process desired.

The zeolite bound zeolite catalyst of the present invention by itself or in combination with one or more catalytically active substances can be used as a catalyst or support for a variety of organic, e.g., hydrocarbon compound conversion processes. Examples of such conversion processes include, as non-limiting examples, the following:

(A) The catalytic cracking of a naphtha feed to produce light olefins. Typical reaction conditions include from about 500° C. to about 750° C. pressures of subatmospheric or atmospheric, generally ranging up to about 10 atmospheres (gauge) and residence time (volume of the catalyst feed rate) from about 10 milliseconds to about 10 seconds.

(B) The catalytic cracking of high molecular weight hydrocarbons to lower weight hydrocarbons. Typical reaction conditions for catalytic cracking include temperatures of from about 400° C. to about 700° C. pressures of from about 0.1 atmosphere (bar) to about 30 atmospheres, and weight hourly space velocities of from about 0.1 to about 100 hr–1.

(C) The transalkylation of aromatic hydrocarbons in the presence of polyalkylaromatic hydrocarbons. Typical reaction conditions include a temperature of from about 200° C. to about 500° C., a pressure of from about atmospheric to about 200 atmospheres, a weight hourly space velocity of from about 1 to about 100 hr-1 and an aromatic hydrocarbon/polyalkylaromatic hydrocarbon mole ratio of from about 0.5/1 to about 16/1.

(D) The isomerization of aromatic (e.g., xylene) feedstock components. Typical reaction conditions for such include a temperature of from about 230° C. to about 510° C., a pressure of from about 0.5 atmospheres to about 50 atmospheres, a weight hourly space velocity of from about 0.1 to about 200 hr-1 and a hydrogen/hydrocarbon mole ratio of from about 0 to about 100.

(E) The dewaxing of hydrocarbons by selectively removing straight chain paraffins. The reaction conditions are dependent in large measure on the feed used and upon the desired pour point. Typical reaction conditions include a temperature between about 200° C. and 450° C., a pressure up to 3,000 psig and a liquid hourly space velocity from 0.1 to 20.

(F) The alkylation of aromatic hydrocarbons, e.g., benzene and alkylbenzenes, in the presence of an alkylating agent, e.g., olefins, formaldehyde, alkyl halides and alcohols having 1 to about 20 carbon atoms. Typical reaction conditions include a temperature of from about 100° C. to about 500° C., a pressure of from about atmospheric to about 200 atmospheres, a weight hourly space velocity of from about 1 hr$^{-1}$ to about 100 hr$^{-1}$ and an aromatic hydrocarbon/alkylating agent mole ratio of from about 1/1 to about 20/1.

(G) The alkylation of aromatic hydrocarbons, e.g., benzene, with long chain olefins, e.g., $C_{14}$ olefin. Typical reaction conditions include a temperature of from about 50° C. to about 200° C. a pressure of from about atmospheric to about 200 atmospheres, a weight hourly space velocity of from about 2 hr$^{-1}$ to about 2000 hr$^{-1}$ and an aromatic hydrocarbon/olefin mole ratio of from about 1/1 to about 20/1. The resulting products from the reaction are long chain alkyl aromatics which when subsequently sulfonated have particular application as synthetic detergents;

(H) The alkylation of aromatic hydrocarbons with light olefins to provide short chain alkyl aromatic compounds, e.g., the alkylation of benzene with propylene to provide cumene. Typical reaction conditions include a temperature of from about 10° C. to about 200° C. a pressure of from about 1 to about 30 atmospheres, and an aromatic hydrocarbon weight hourly space velocity (WHSV) of from 1 hr$^{-1}$ to about 50 hr$^{-1}$;

(I) The hydrocracking of heavy petroleum feedstocks, cyclic stocks, and other hydrocrack charge stocks. The zeolite catalyst will contain an effective amount of at least one hydrogenation component of the type employed in hydrocracking catalysts.

(J) The alkylation of a reformate containing substantial quantities of benzene and toluene with fuel gas containing short chain olefins (e.g., ethylene and propylene) to produce mono- and dialkylates. Preferred reaction conditions include temperatures from about 100° C. to about 250° C., a pressure of from about 100 to about 800 psig, a WHSV-olefin from about 0.4 hr$^{-1}$ to about 0.8 hr$^{-1}$, a WHSV-reformate of from about 1 hr$^{-1}$ to about 2 hr$^{-1}$ and, optionally, a gas recycle from about 1.5 to 2.5 vol/vol fuel gas feed.

(K) The alkylation of aromatic hydrocarbons, e.g., benzene, toluene, xylene, and naphthalene, with long chain olefins, e.g., $C_{14}$ olefin, to produce alkylated aromatic lube base stocks. Typical reaction conditions include temperatures from about 160° C. to about 260° C. and pressures from about 350 to 450 psig.

(L) The alkylation of phenols with olefins or equivalent alcohols to provide long chain alkyl phenols. Typical reaction conditions include temperatures from about 100° C. to about 250° C., pressures from about 1 to 300 psig and total WHSV of from about 2 hr$^{-1}$ to about 10 hr$^{-1}$.

(M) The conversion of light paraffins to olefins and/or aromatics. Typical reaction conditions include temperatures from about 425° C. to about 760° C. and pressures from about 10 to about 2000 psig. Processes for preparing aromatic compounds from light paraffins are described in U.S. Pat. No. 5,258,563, which is hereby incorporated by reference.

(N) The conversion of light olefins to gasoline, distillate and lube range hydrocarbons. Typical reaction conditions include temperatures of from about 175° C. to about 375° C. and a pressure of from about 100 to about 2000 psig.

(O) Two-stage hydrocracking for upgrading hydrocarbon streams having initial boiling points above about 200° C. to premium distillate and gasoline boiling range products or as feed to further fuels or chemicals In a first stage, the zeolite bound zeolite catalyst comprising one or more catalytically active substances, e.g., a Group VIII metal, and the effluent from the first stage would be reacted in a second stage using a second zeolite catalyst, e.g., zeolite Beta, comprising one or more catalytically active substances, e.g., a Group VIII metal. Typical reaction conditions include temperatures from about 315° C. to about 455° C., a pressure from about 400 to about 2500 psig, hydrogen circulation of from about 1000 to about 10,000 SCF/bbl and a liquid hourly space velocity (LHSV) of from about 0.1 to 10;

(P) A combination hydrocracking/dewaxing process in the presence of the zeolite bound zeolite catalyst comprising a hydrogenation metal and a zeolite such as zeolite Beta. Typical reaction conditions include temperatures from about 350° C., to about 400° C. pressures from about 1400 to about 1500 psig, LHSVs from about 0.4 to about 0.6 and a hydrogen circulation from about 3000 to about 5000 SCF/bbl.

(Q) The reaction of alcohols with olefins to produce mixed ethers, e.g., the reaction of methanol with isobutene and/or isopentene to provide methyl-t-butyl ether (MTBE) and/or t-amyl methyl ether (TAME). Typical conversion conditions include temperatures from about 20° C. to about 200° C., pressures from 2 to about 200 atm, WHSV (gram-olefin per hour gram-zeolite) from about 0.1 hr$^{-1}$ to about 200 hr$^{-1}$ and an alcohol to olefin molar feed ratio from about 0.1/1 to about 5/1.

(R) The disproportionation of aromatics, e.g., the disproportionation of toluene, to make benzene and paraxylene. Typical reaction conditions include a temperature of from about 200° C. to about 760° C., a pressure of from about atmospheric to about 60 atmosphere (bar), and a WHSV of from about 0.1 hr$^{-1}$ to about 30 hr$^{-1}$.

(S) The conversion of naphtha (e.g., $C_6$–$C_{10}$) and similar mixtures to highly aromatic mixtures. Thus, normal and slightly branched chained hydrocarbons, preferably having a boiling range above about 40° C., and less than about 200° C., can be converted to products having a substantial higher octane aromatics content by contacting the hydrocarbon feed with the zeolite bound zeolite at a temperature in the range of from about 400° C. to 600° C., preferably 480° C. to 550° C. at pressures ranging from atmospheric to 40 bar, and liquid hourly space velocities (LHSV) ranging from 0.1 to 15.

(T) Selectively separating hydrocarbons by adsorption of the hydrocarbons. Examples of hydrocarbon separation include xylene isomer separation and separating olefins from a feed stream containing olefins and paraffins.

(U) The conversion of oxygenates, e.g., alcohols, such as methanol, or ethers, such as dimethylether, or mixtures thereof to hydrocarbons including olefins and aromatics with reaction conditions including a temperature of from about 275° C. to about 600° C., a pressure of from about 0.5 atmosphere to about 50 atmospheres and a liquid hourly space velocity of from about 0.1 to about 100;

(V) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a zeolite catalyst at a temperature in the range of from about 250° C. to about 800° C., a LHSV of from about 0.2 to about 50 and a hydrocarbon partial pressure of from about 0.1 to about 50 atmospheres. Temperatures below about 250° C. may be used to oligomerize the feedstock when the feedstock is in the liquid phase when contacting the zeolite catalyst. Thus, when the olefin feedstock contacts the catalyst in the liquid phase, temperatures of from about 10° C. to about 250° C. may be used.

(W) The conversion of $C_2$ unsaturated hydrocarbons (ethylene and/or acetylene) to aliphatic $C_{6-12}$ aldehydes and converting said aldehydes to the corresponding $C_{6-12}$ alcohols, acids, or esters.

In general, the catalytic conversion conditions include a temperature of from about 100° C. to about 760° C., a pressure of from about 0.1 atmosphere (bar) to about 200 atmospheres (bar), a weight hourly space velocity of from about 0.08 $hr^{-1}$ to about 2,000 $hr^{-1}$.

Although many hydrocarbon conversion processes prefer that the binder crystals have lower acidity to reduce undesirable reactions external to the core crystals, some processes may prefer that the binder crystals have higher acidity.

Processes that find particular application using the zeolite bound zeolite catalyst of the present invention are those where two or more reactions are taking place within the zeolite bound zeolite catalyst. Each of the zeolites of this catalyst would be separately tailored to promote or inhibit different reactions. A process using such a catalyst benefits not only from greater apparent catalyst activity, greater zeolite accessibility, and reduced non-selective surface acidity possible with zeolite bound zeolites, but from a tailored catalyst system.

Examples of zeolite bound zeolite catalysts and exemplary uses are shown below in Table I:

TABLE I

| Zeolite Bound Zeolite Catalyst | Core | | Binder | | Use |
|---|---|---|---|---|---|
| | Structure Type | Zeolite | Structure Type | Zeolite | |
| A | MFI | ZSM-5 | MEL MFI | Silicalite 2 Silicalite | Disproportionation of Toluene |
| B | MFI and FAU | ZSM-5 and Zeolite Y | MEL | Silicalite 2 | Cracking/isomerization |
| C | MFI and BEA | ZSM-5 and Beta | MFI | Silicalite | Xylenes Isomerization and ethyl benzene dealkylation |
| D | MEL and MOR | ZSM-11 and mordenite | MFI | Silicalite | Xylenes Isomerization and ethyl benzene dealkylation |
| E | MFI and KFI | ZSM-5 and ZK-5 | MEL | ZSM-11 | Cracking |
| F | MFI and KFI | ZSM-5 and ZK-5 | MTW | ZSM-12 | Cracking |
| G | MFI | ZSM-5 | TON and MFI | ZSM-22 and ZSM-5 | Oligomerization |
| H | MFS | ZSM-57 | TON and MFI | ZSM-22, and ZSM-5 | Oligomerization |
| I | VFI, and FAU | VPI-5, and Zeolite Y | MTW | ZSM-12 | Oligomerization |
| J | BEA and MFI | Beta, and ZSM-5 | FER | ZSM-35 | Cracking |
| K | FAU | Zeolite Y | MTT and MFI | ZSM-23 and ZSM-5 | Cracking |
| L | TON and MFI | ZSM-22 and ZSM-5 | MFI | Silicalite | Disproportation of Toluene |
| M | FAU, MFI, and KFI | Zeolite Y, ZSM-5, and ZK-5 | MEL | ZSM-11 | Cracking |
| N | LTL and FAU | Zeolite L and Zeolite Y | FAU | Zeolite Y | Reforming |
| O | MFI and MEL | Silicalite and Silicalite 2 | MEL | Silicalite 2 | Isomerization |
| P | MOR and MFI | Mordenite and ZSM-5 | MFI | Silicalite | Disproportionation of Toluene |
| Q | BEA and MEL | Beta and ZSM-11 | MFI | Silicalite | Disproportionation of Toluene |
| R | BEA, MEL, and MFI | Beta, ZSM-11, and ZSM-5 | MEL and MFI | Silicalite 2 and Silicalite | Disproportionation of Toluene |
| S | MEL and MFI | Ga-MEL and ZSM-5 | MFI | Silicalite | $C_2$–$C_5$ Aromatization |
| T | MOR | Mordenite | MEL and MFI | Silicalite 2 and Silicalite | Disproportionation of Toluene |
| U | Higher Acidity MFI and Moderate Acidity MFI | Higher Acidity ZSM-5 and Moderate Acidity ZSM-5 | Lower Acidity MFI | Silicalite | Xylenes Isomerization and ethyl benzene dealkylation |

TABLE I-continued

| Zeolite Bound Zeolite Catalyst | Core | | Binder | | |
|---|---|---|---|---|---|
| | Structure Type | Zeolite | Structure Type | Zeolite | Use |
| V | ETS-10 and FAU | ETS-10 and Zeolite Y | FAU | Zeolite Y | Reforming |

Examples of preferred zeolite bound zeolite catalyst systems include the following:

1. A zeolite bound zeolite catalyst comprising core crystals of an acidic first zeolite having cracking activity and a second zeolite having less acidity than the first zeolite and binder crystals of a third zeolite, having very low or no acidic activity. The zeolite bound zeolite catalyst system finds particular application in catalytic cracking. Catalysts E and F in Table I are examples of such a catalyst.
2. A zeolite bound zeolite catalyst having core crystals comprising an acidic first zeolite having a large pore with cracking activity and an acidic second zeolite having intermediate pore size and having cracking activity and binder crystals of an acidic intermediate pore size zeolite having cracking activity. Catalyst M in Table I is an example of such a catalyst.
3. A zeolite catalyst system comprising core crystals containing a first zeolite that has moderate acid activity and optionally contains a hydrogenation/dehydrogenation metal, a second zeolite having greater acid activity than the first zeolite and optionally a hydrogenation/dehydrogenation metal and binder crystals of a third zeolite having lower acid activity than the first zeolite. The pore size of the zeolites will depend upon the type of process in which the catalyst system is utilized. For example, the catalyst system can be utilized in a combined xylene isomerization/ethylbenzene dealkylation process wherein the ethylbenzene is dealkylated to benzene and ethane and isomers of xylenes are isomerized to equilibrium amounts. In such a system, the first zeolite will preferably have a large or intermediate pore size zeolite and have large crystal size and the second zeolite will also preferably have a larger and have large crystal size or intermediate pore size zeolite and have a small crystal size so as to have high surface acidity. Catalysts C, D, and U in Table I is an example of such a catalyst.
4. A zeolite bound zeolite catalyst comprising core crystals of a first acidic zeolite and binder crystals of a third zeolite and fourth zeolite both of which have little or no acidic activity. The pore size of the zeolites will depend on the type of process in which the catalyst is utilized. For example, if the catalyst is to be used in the manufacture of benzene and paraxylene by the disproportionation of toluene, the first zeolite will preferably have an intermediate pore size and the third and fourth zeolites can be selected to enhance performance of the first zeolite, e.g., to sieve undesired molecules either leaving the first zeolite phase or exiting the first zeolite phase, as the case may be or to control accessibility of the acid sites on the external surfaces of its first zeolite to reactants. Catalyst A in Table I is an example of such a catalyst.

The zeolite-bound zeolite catalyst of the present invention has particular application in the vapor phase disproportionation of toluene. Such vapor phase disproportionation comprises contacting toluene under disproportionation conditions with the zeolite bound zeolite catalyst to yield a product mixture which comprises a mixture of unreacted (unconverted) toluene, benzene and xylene. In the more preferred embodiment, the catalyst is first selectivated prior to use in the disproportionation process to enhance conversion of toluene to xylene and to maximize the catalyst selectivity towards the production of paraxylene. Processes for selectivating the catalyst are known to persons skilled in the art. For instance, selectivation may be accomplished by exposing the catalyst in a reactor bed to a thermally decomposable organic compound, e.g. toluene, at a temperature in excess of the decomposition temperature of said compound, e.g. from about 480° C. to about 650° C., more preferably 540° C. to about 650° C., at a WHSV in the range of from about 0.1 to 20 lbs. of feed per pound of catalyst per hour, at a pressure in the range of from about 1 to 100 atmospheres, and in the presence of 0 to about 2 moles of hydrogen, more preferably from about 0.1 to about 2 moles of hydrogen per mole of organic compound, and optionally in the presence of 0–10 moles of nitrogen or another inert gas per mole of organic compound. This process is conducted for a period of time until a sufficient quantity of coke has been deposited on the catalyst surface, generally at least about 2% by weight and more preferably from about 8 to about 40% by weight of coke. In a preferred embodiment, such a selectivation process is conducted in the presence of hydrogen in order to prevent rampant formation of coke on the catalyst.

Selectivation of the catalyst can also be accomplished by treating the catalyst with a selectivation agent such as an organosilicon compound. Examples of organosilicon compounds include polysiloxane including silicones, a siloxane, and a silane including disilanes and alkoxysilanes.

Silicone compounds that find particular application can be represented by the formula:

$$\left[ \begin{array}{c} R_1 \\ | \\ Si - O \\ | \\ R_2 \end{array} \right]_n$$

wherein $R_1$ is hydrogen, fluoride, hydroxy, alkyl, aralkyl, alkaryl or fluoro-alkyl. The hydrocarbon substituents generally contain from 1 to 10 carbon atoms and preferably are methyl or ethyl groups. $R_2$ is selected from the same group as $R_1$, and n is an integer of at least 2 and generally in the range of 2 to 1000. The molecular weight of the silicone compound employed is generally between 80 and 20,000 and preferably 150 to 10,000. Representative silicone compounds included dimethylsilicone, diethylsilicone, phenylmethylsilicone, methyl hydrogensilicone, ethylhydrogensilicone, phenylhydrogensilicone, methylethylsilicone, phenylethylsilicone, diphenylsilicone, methyltri fluoropropylsilicone, ethyltrifluoropropylsilicone, tetrachlorophenyl methyl silicone, tetrachlorophenylethyl silicone, tetrachloro phenylhydrogen silicone, tetrachlorophenylphenyl silicone, methylvinylsilicone and ethylvinylsilicone. The silicone compound need not be linear but may be cyclic as for example hexamethylcyclotrisiloxane, octamethylcyclotetrasiloxane, hexaphenyl cyclotrisiloxane and octaphenylcyclotetrasiloxane. Mixtures of these compounds may also be used as well as silicones with other functional groups.

Useful siloxanes or polysiloxanes include as non-limiting examples hexamethylcyclotrisiloxane, octamethylcyclotetrasiloxane, decamethyl cyclopentasiloxane, hexamethyldisiloxane, octamethytrisiloxane, decamethyltetrasiloxane, hexaethylcyclotrisiloxane, octaethylcyclo tetrasiloxane, hexaphenylcyclotrisiloxane and octaphenylcyclo tetrasiloxane. Useful silanes, disilanes, or alkoxysilanes include organic substituted silanes having the general formula:

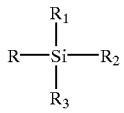

wherein R is a reactive group such as hydrogen, alkoxy, halogen, carboxy, amino, acetamide, trialkylsilyoxy, $R_1$, $R_2$, and $R_3$ can be the same as R or can be an organic radical which may include alkyl of from 1 to 40 carbon atoms, alkyl or aryl carboxylic acid wherein the organic portion of the alkyl contains 1 to 30 carbon atoms and the aryl group contains 6 to 24 carbon which may be further substituted, alkylaryl and arylalkyl groups containing 7 to 30 carbon atoms. Preferably, the alkyl group for an alkyl silane is between 1 and 4 carbon atoms in chain length.

When used the vapor phase disproportionation of toluene, the catalyst can comprise a first crystals having a micron average particle size from about 2 to about 6 of intermediate pore size zeolite, e.g., MFI structure type, having a silica to alumina mole ratio of from about 20 to about 200:1, preferably, 25:1 to about 120:1, a binder comprising third crystals having an average particle size of less than about 0.1 micron of intermediate pore size, e.g., MFI or MEL structure type, having a alumina to silica mole ratio grater than about 200:1 to about 10,000:1, e.g., Silicalite or Silicalite 2, and second crystals of a second zeolite of an intermediate pore size zeolite having a structure type different from the first zeolite, e.g., TON structure type.

Once the catalyst has been selectivated to the desired degree, reactor selectivation conditions are changed to disproportionation conditions. Disproportionation conditions include a temperature between about 400° C. and 550° C. more preferably between about 425° C. and 510° C., at a hydrogen to toluene mole ratio of from 0 to about 10, preferably between about 0.1 and 5 and more preferably from about 0.1 to 1, at a pressure between about 1 atmosphere and 100 atmospheres and utilizing VHSV of between about 0.5 and 50

The disproportionation process may be conducted as a batch, semi-continuous or continuous operation using a fixed or moving bed catalyst system deposited in a reactor bed. The catalyst may be regenerated after coke deactivation by burning off the coke to a desired extent in an oxygen-containing atmosphere at elevated temperatures as know in the art.

The zeolite bound zeolite of the present invention also finds particular application as a catalyst in a process for isomerizing one or more xylene isomers in a $C_8$ aromatic feed to obtain ortho-, meta-, and para-xylene in a ratio approaching the equilibrium value. In particular, xylene isomerization is used in conjunction with a separation process to manufacture para-xylene. For example, a portion of the para-xylene in a mixed $C_8$ aromatics stream may be recovered using processes known in the art, e.g., crystallization, adsorption, etc. The resulting stream is then reacted under xylene isomerization conditions to restore ortho-, meta-, and paraxylenes to a near equilibrium ratio. Ethylbenzene in the feed is either removed from the stream or is converted during the process to xylenes or to benzene which are easily separated by distillation. The isomerate is blended with fresh feed and the combined stream is distilled to remove heavy and light by-products. The resultant $C_8$ aromatics stream is then recycled to repeat the cycle.

It is important that xylene isomerization catalysts produce a near equilibrium mixture of xylenes and it is also usually desirable that the catalyst convert ethylbenzene with very little net loss of xylenes. The zeolite bound zeolite catalyst can find particular application in this regard. The acidity of the zeolites e.g., silica to trivalent metal oxide (alumina, gallia, boron oxide, iron oxide, and the like) mole ratio of the core crystals of the zeolite can be selected to balance xylene isomerization and ethylbenzene dealkylation while minimizing undesirable side reactions. This process is carried out by contacting a $C_8$ aromatic stream containing one or more xylene isomers or ethylbenzene or mixtures thereof, under xylenes isomerization/EB conversion conditions with the zeolite bound zeolite catalyst. Preferably, at least 30% of the ethylbenzene is converted.

In the vapor phase, suitable isomerization conditions include a temperature in the range 250° C.–600° C., preferably 300° C.–550° C., a pressure in the range 0.5–50 atm abs, preferably 10–25 atm abs, and a weight hourly space velocity (WHSV) of 0.1 to 100, preferably 0.5 to 50. Optionally, isomerization in the vapor phase is conducted in the presence of 3.0 to 30.0 moles of hydrogen per mole of alkylbenzene. If hydrogen is used, the metal components of the catalyst preferably include 0.1 to 2.0 wt. % of a hydrogenation/dehydrogenation component selected from Group VIII of the Periodic Table of Elements, especially platinum, palladium, or nickel. By Group VIII metal component, it is meant the metals and their compounds such as oxides and sulfides.

The zeolite bound zeolite catalyst of the present invention can be especially useful as a catalyst in a process for cracking a naphtha feed, e.g., $C_4$+ naphtha feed, particularly a $C_4$–290° C. naphtha feed to produce low molecular weight olefins, e.g., $C_2$ through $C_4$ olefins, particularly ethylene and propylene. Such a process is preferably carried out by contacting the naphtha feed at temperatures ranging from 500° C. to about 750° C., more preferably 550° C. to 675° C., at a pressure from subatmospheric up to 10 atmospheres, but preferably from about 1 atmosphere to about 3 atmospheres.

The zeolite bound zeolite catalyst of the present invention is useful as a catalyst in the transalkylation of polyalkylaromatic hydrocarbons. Examples of suitable polyalkylaromatic hydrocarbons include di-, tri-, and tetra-alkyl aromatic hydrocarbons, such as diethylbenzene, triethylbenzene, diethylmethylbenzene (diethyl-toluene), diisopropylbenzene, triisopropylbenzene, diisopropyltoluene, dibutylbenzene, and the like. Preferred polyalkylaromatic hydro-carbons are the dialkyl benzenes. Particularly preferred polyalkyl-aromatic hydrocarbons are diisopropylbenzene and diethylbenzene.

The transalkylation process will preferably have a molar ratio of aromatic hydrocarbon to polyalkylaromatic hydrocarbon of preferably from about 0.5:1 to about 50:1, and more preferably from about 2:1 to about 20:1. The reaction temperature will preferably range from about 340° C. to 500° C. to maintain at least a partial liquid phase, and the pressure will be preferably in the range of about 50 psig to 1,000 psig, preferably 300 psig to 600 psig. The weight hourly space velocity will range from about 0.1 to 10.

The zeolite bound zeolite catalyst have application in aromatization processes which convert paraffins to aromatic compounds. Example of suitable paraffins including aliphatic hydrocarbons containing 2 to 12 carbon atoms. The hydrocarbons may be straight chain, open or cyclic and may be saturated or unsaturated. Example of hydrocarbons include propane, propylene, n-butane, n-butenes, isobutane, isobutene, and straight- and branch-chain and cyclic pentanes, pentenes, hexanes, and hexenes.

The aromatization conditions include a temperature of from about 200° C. to about 700° C., a pressure of from about 0.1 atmosphere to about 60 atmospheres, a weight hourly space velocity (WHSV) of from about 0.1 to about 400 and a hydrogen/hydrocarbon mole ratio of from about 0 to about 20.

The zeolite bound zeolite catalyst used in the aromatization process can comprise core crystals of two intermediate pore size zeolites such a MFI type zeolite (example ZSM-5) and MEL type zeolite (ZSM-11), and binder crystals of a intermediate pore size such as a MEL structure type. The catalyst preferably contains gallium or zinc. Gallium may be incorporated into the catalyst during synthesis of the zeolite or it may be exchanged or impregnated or otherwise incorporated into the zeolite after synthesis. Preferably 0.05 to 10, and most preferably 0.1 to 2.0 wt. % gallium is associated with the zeolite bound zeolite catalyst. The gallium can be associated with the first zeolite, second zeolite, third, zeolite, or fourth zeolite. Usually zinc will be incorporated into the catalyst by ion exchange and will generally present in the zeolite bound zeolite in the amounts specified above for gallium.

The zeolite-bound zeolite catalysts have application in reactions involving aromatization and/or dehydrogenation. They can particularly useful in processes for the dehydrocyclization and/or isomerization of acyclic hydrocarbons in which the hydrocarbons are contacted at a temperature of from 370° C. to 600° C., preferably from 430° C. to 550° C. with the zeolite-bound zeolite catalyst, e.g., core crystals of zeolite L and zeolite Y bound by zeolite Y, preferably having at least 90% of the exchangeable cations as alkali metal ions and incorporating at least one Group VIII metal having dehydrogenating activity, so as to convert at least part of the acyclic hydrocarbons into aromatic hydrocarbons.

EXAMPLE 1
Preparation of Zeolite Bound Zeolite

The formation of silica bound ZSM-5 and ZSM-22 extrudates was carried out as follows:

| Components Used for Preparation | Quantity (Grams) | Component No. |
|---|---|---|
| ZSM-5 crystals | 12.50 | 1 |
| ZSM-22 crystals | 12.50 | 2 |
| Water | 6.24 | 3 |
| Silica Gel (Aerosil300) | 2.36 | 4 |
| Silica Sol (Nalcoag 1034A) | 24.66 | 5 |
| Methocel | 0.14 | 6 |
| Water | 19.52 | 7 |

Components 1 to 6 were mixed in the bowl of a household mixer for 6 minutes. Component 7 was then added to the bowl and mixing continued for 3 more minutes. A thick extrudable paste was obtained. The paste was extruded into 2 mm diameter extrudates. The extrudates were dried 2 hours at room temperature and overnight at 130° C. next, the extrudates were calcined 2 hours at 120° C. (heating rate 0.5° C./min) and 16 hours at 490° C. (heating rate 1° C./min).

Composition of calcined silica-bound extrudates:

| Zeolite: | 70 wt. % |
|---|---|
| SiO$_2$ binder: | 30 wt. % |

XRD analysis of the green extrudates indicated the presence of both MFI and TON. A halo of amorphous material could be seen which indicated the presence of silica.

The extrudates were converted to the zeolite bound zeolite as follows.

| Components Used For Preparation | Quantity (Grams) | Component No. |
|---|---|---|
| Silica Bound ZSM-5/ZSM-22 | 5.02 | 1 |
| NaOH pellets | 0.10 | 2 |
| t-butylammoniumbromide | 0.77 | 3 |
| Water | 6.69 | 4 |

Components 2 and 3 were dissolved in component 4 and stirred until a clear solution was obtained. The template used in the conversion i.e., t-butylammoniumbromide, was specifically chosen to convert the amorphous silica to MEL structure type. Component 1 was then added to the solution. The synthesis mixture was then placed in a stainless steel autoclave at heated at 150° C. for 80 hours (heat up time was 2 hours). The molar composition of the synthesis mixture was:

0.50Na$_2$O/0.96TBABr/10SiO$_2$/149H$_2$O

The extrudates were washed 5 times in 300 ml water until the conductivity of the last washing water was less then 10 $\mu$S/cm and then dried overnight at 120° C.

The product extrudates were characterized by x-ray diffraction (XRD) and scanning electron microscopy (SEM) with the following results:

XRD: Showed excellent crystallinity and indicated the presence of MFI structure type. No amorphous halo could be seen, which would have indicated the presence of unconverted silica. The presence of MEL structure type can not be demonstrated unequivocally in the presence of large amounts of MFI. The amount of TON is below the detection limits.

SEM: 10,000 times magnification micrograph (FIG. 1) show the showed presence of the original spherical MFI core crystals (3 $\mu$m) coated with new formed elongated crystals [1 $\mu$m×0.2 $\mu$m]and smaller size glue crystals.

EXAMPLE 2
Preparation of Zeolite Bound Zeolite

Silica bound ZSM-5 and ZSM-22 extrudates prepared according to Example 1 were converted to the zeolite bound zeolite as follows.

| Components Used For Preparation | Quantity (Grams) | Component No. |
|---|---|---|
| Silica Bound ZSM-5/ZSM-22 | 5.00 | 1 |
| NaOH pellets | 0.09 | 2 |

-continued

| Components Used For Preparation | Quantity (Grams) | Component No. |
|---|---|---|
| t-butylammoniumbromide | 0.77 | 3 |
| Water | 9.42 | 4 |

Components 2 and 3 were dissolved in component 4 and stirred until a clear solution was obtained. The template used in the conversion i.e., t-butylammoniumbromide, was specifically chosen to convert the amorphous silica to MEL structure type. Component 1 was then added to the solution. The synthesis mixture was then placed in a stainless steel autoclave at heated at 150° C. for 20 hours (heat up time was 2 hours). The molar composition of the synthesis mixture was:

0.47 Na$_2$O/0.95TBABr/10SiO$_2$/209.5H$_2$O

The extrudates were washed 5 times in 300 ml water until the conductivity of the last washing water was less then 10 μS/cm and then dried overnight at 120° C.

The product extrudates were characterized by x-ray diffraction (XRD) and scanning electron microscopy (SEM) with the following results:

XRD: Showed excellent crystallinity and indicated the presence of MFI and TON structure types. A small amorphous halo may be present. The presence of MEL structure type can not be demonstrated unequivocally in the presence of large amounts of MFI.

Figure 2:
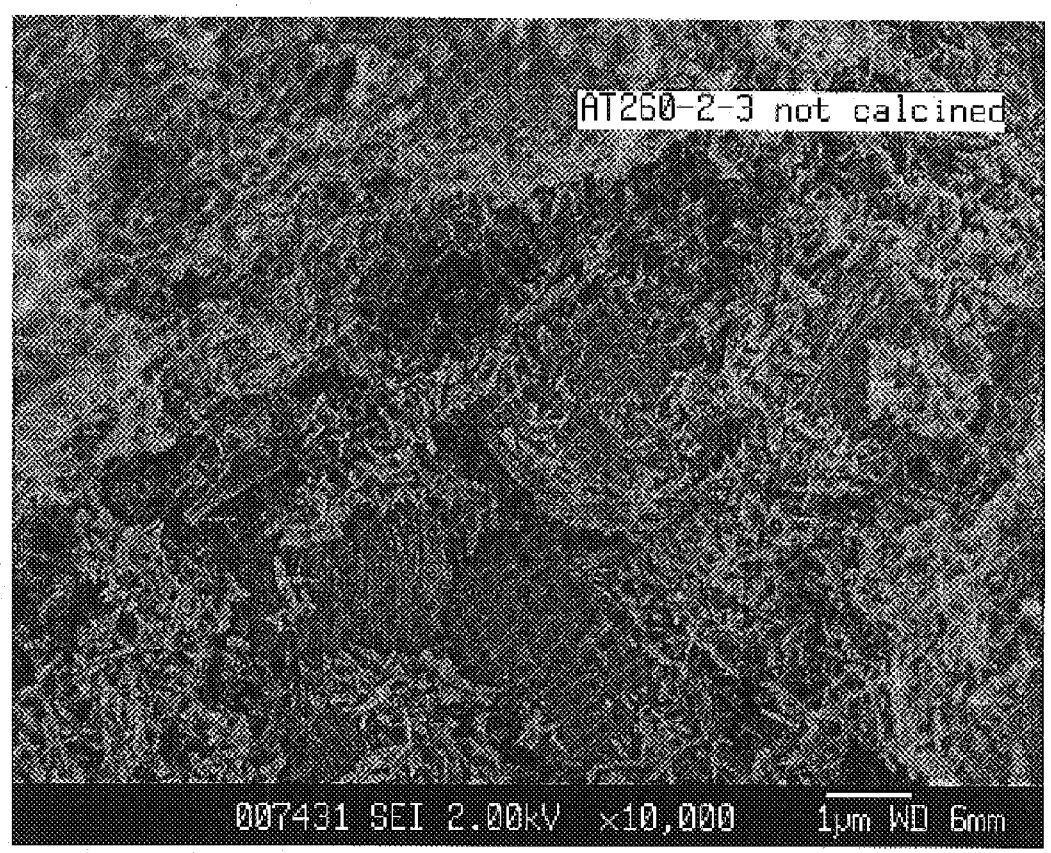
FIG. 2 represents an electron micrograph of the catalyst prepared in Example 2.

SEM: 10,000 times magnification micrograph (FIG. 2) shows the presence of both of the original core crystals and newly formed binding crystals. The newly formed crystals appear to overgrow the MFI core crystals but not the TONE core crystals.

EXAMPLE 3

The zeolite bound zeolite prepared according to Example 1 was used for the disproportionation of toluene.

Before packing into a stainless steel reactor, one gram of the zeolite bound zeolite was mixed with 1 gram of 80–100 ultra-pure quartz sand. The catalyst was pretreated at 500 degrees C. with H$_2$ for two hours followed by co-feed of toluene and hydrogen. The total pressure of the reaction was controlled at 45 psig. The partial pressure of toluene feed was 5.4 psia and partial pressure of H$_2$ feed was 54 psia. The toluene flow rate was 36.7 mmol/hr. The hydrogen stream was controlled by a Brooks mass flow controller and the toluene feed was pumped by a high pressure liquid pump. The experiment was preformed under differential regimes so that the reaction rate could be measured. All products were analyzed by an on-line HP 6890 GC equipped with Chirasil DEX CP and DB1 columns.

EXAMPLE 4

To compare the performance of the zeolite bound zeolite catalyst, H-ZSM-5 catalyst and H-ZSM-22 catalyst were separately used for the disproportionation of toluene. The H-ZSM-5 catalyst had a silica to alumina mole ratio of 34 and comprised crystals with particle sizes in the range of from 0.2 to 1.0 micron. The H-ZSM-22 had a silica to alumina mole ratio of 63 and comprised crystals having average length of 1 μm. The tests were carried out using the procedure described in Example 2 except that before packing into the stainless steel reactor, each catalyst was mixed with 2.5 gram of 80–100 mesh ultra-pure quartz to improve feed-catalyst contacting.

Figure 3:
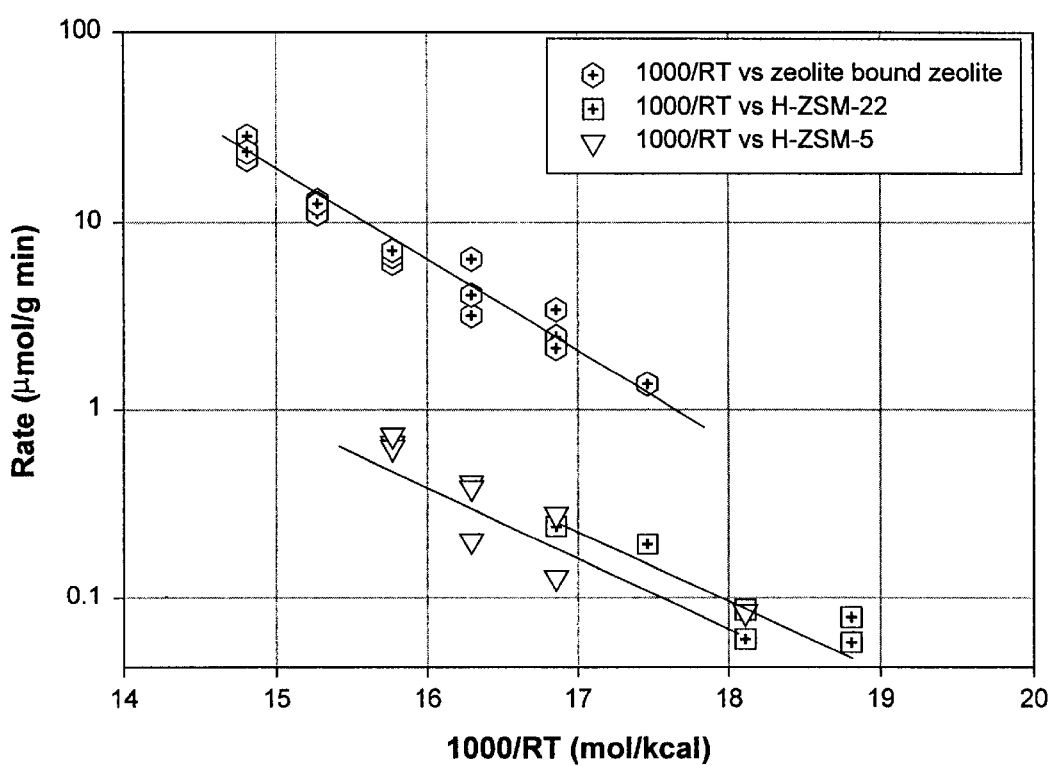
FIG. 3 is a graph showing the rate of reaction of the zeolite bound zeolite and two catalysts not of the invention as a function of temperature[1].

FIG. 3 graphically compares the rate of reaction of the zeolite bound zeolite catalyst, the H-ZSM-5 catalyst, and the H-ZSM-22 catalyst as a function of temperature$^{-1}$ and shows a comparison of the performance of the three catalysts. It is clear from the Figure that the zeolite bound zeolite catalyst showed approximately 10 times greater activity than both the H-ZSM-22 and H-ZSM-5 catalysts over a wide range of temperature. It is reported by Y. Xiong, P. G. Rodewald, and C. D. Chang in "On the Mechanism of Toluene Disproportionation in a Zeolite Environment," J. Am. Chem. Soc. 117 (1995) 9427–9431 that the reaction mechanism for toluene disproportionation has an initial hydride transfer step and this step is the most rate limited. One possible explanation for the high activity of the zeolite bound zeolite catalyst that it offers a high hydride transfer rate.

What is claimed is:

1. A zeolite bound zeolite catalyst which does not contain significant amounts of non-zeolitic binder and comprises:
    (a) core crystals containing first crystals of a first zeolite and optionally second crystals of a second zeolite and when present said second zeolite has a composition, structure type, or both that is different from said first zeolite; and
    (b) binder crystals that bind together the core crystals and have an average particle size that is less than the average particle size of said core crystals, said binder crystals containing third crystals of a third zeolite and optionally fourth crystals of a fourth zeolite and when present said fourth zeolite has a composition, structure type, or both that is different from said third zeolite;
    wherein at least one of said second crystals of said second zeolite, said fourth crystals of said fourth zeolite, or both are present in said zeolite bound zeolite catalyst in an amount of from about 1.0 to about 70 percent by weight based on the weight of said zeolite bound zeolite catalyst.

2. The catalyst recited in claim 1, wherein said catalyst contains said second crystals of second zeolite and does not contain said fourth crystals of said fourth zeolite.

3. The catalyst recited in claim 2, wherein said second zeolite has a structure type and composition that are different from said first zeolite.

4. The catalyst recited in claim 2, wherein second crystals have an average particle size that is smaller than the average particle size of said first crystals.

5. The catalyst recited in claim 1, wherein said catalyst contains said fourth crystals of said fourth zeolite and does not contain said second crystals of said second zeolite.

6. The catalyst recited in claim 5, wherein said fourth zeolite has a structure type and composition that are different from said third zeolite.

7. The catalyst recited in claim 1, wherein said catalyst contains said second crystals of second zeolite and said fourth crystals of said fourth zeolite.

8. The catalyst recited in claim 1, wherein said first zeolite and said second zeolite is a large pore zeolite or an intermediate pore size zeolite.

9. The catalyst recited in claim 8, wherein the structure type of said first zeolite and said second zeolite are selected from the group consisting of MAZ, BEA, MFI, MEL, MTW, EMT, MTT, HEU, FER, TON, and EUO.

10. The catalyst recited in claim 9, wherein said first zeolite and said second zeolite is an intermediate pore size zeolite.

11. The catalyst recited in claim 10, wherein said catalyst is prepared by aging at elevated temperatures a silica-bound aggregate containing first crystals of said first zeolite in an aqueous ionic solution containing a source of hydroxy ions sufficient to convert the silica in the aggregate to the binder zeolite.

12. The catalyst recited in claim 10, wherein all zeolites in said catalyst are gallosilicate or aluminosilicate.

13. The catalyst recited in claim 10 wherein said binder crystals form an overgrowth over at least a portion of said core crystals.

14. The catalyst recited in claim 10, wherein said catalyst contains less than about 5% by weight of non-zeolitic binder based on the weight of said catalyst.

15. The catalyst recited in claim 10, wherein said core crystals have an average particle size greater of from about 1 to about 6 microns.

16. The catalyst recited in claim 15, wherein said crystals of said binder have an average particle size of from 0.1 to 0.5 micron.

17. The catalyst recited in claim 10, wherein all zeolites present in said catalyst have the same structure.

18. The catalyst recited in claim 9, wherein the zeolite of the binder has lower acidity than the zeolite of the core.

19. The catalyst recited in claim 9, wherein the zeolite of the binder has higher acidity than the zeolite of the core.

20. The catalyst recited in claim 1, wherein said catalyst further comprises at least one catalytically active metal.

* * * * *